Nov. 17, 1953    W. T. ANDERSON, JR    2,659,833
ULTRAVIOLET VAPOR ELECTRIC DISCHARGE DEVICE
Filed Nov. 9, 1949    2 Sheets-Sheet 1
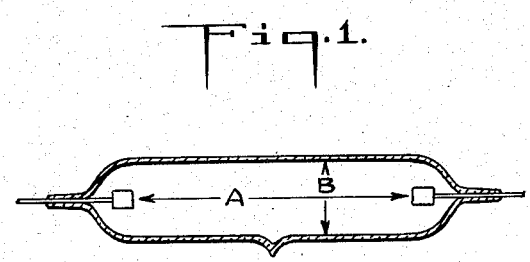
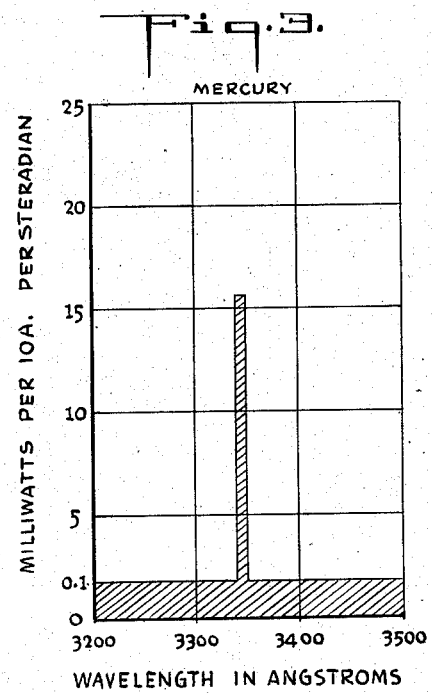
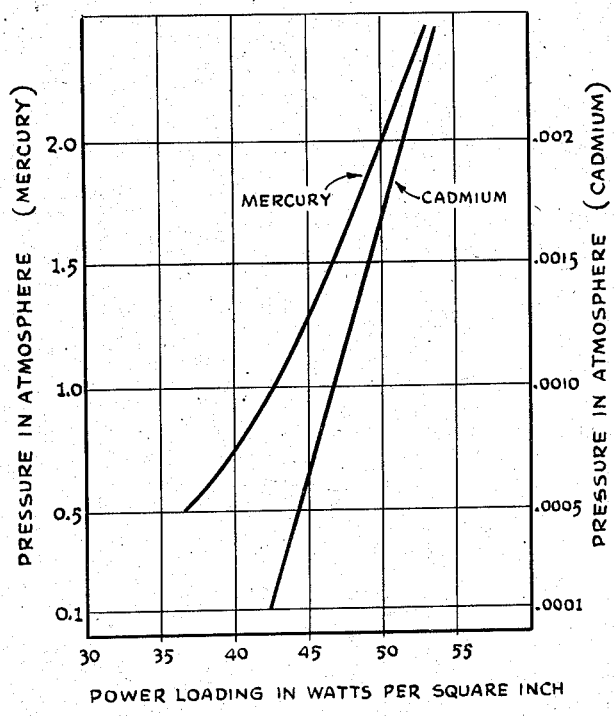
INVENTOR.
WILLIAM T. ANDERSON, JR.
BY
ATTORNEY Nov. 17, 1953 W. T. ANDERSON, JR 2,659,833
ULTRAVIOLET VAPOR ELECTRIC DISCHARGE DEVICE
Filed Nov. 9, 1949 2 Sheets-Sheet 2
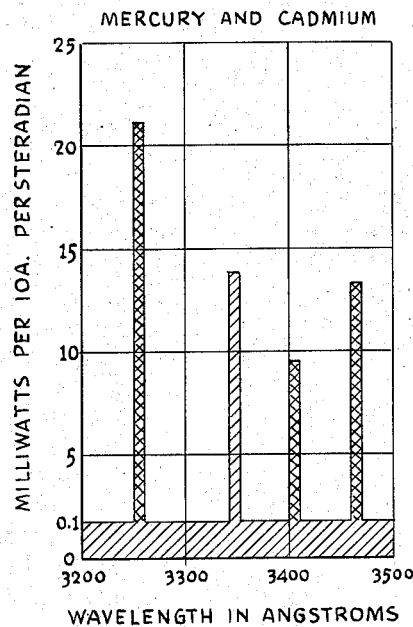
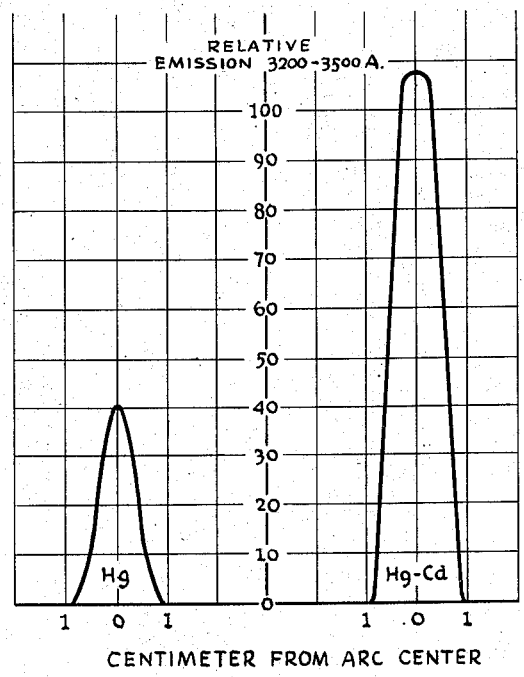
INVENTOR.
WILLIAM T. ANDERSON, JR.
BY
ATTORNEY Patented Nov. 17, 1953

2,659,833

UNITED STATES PATENT OFFICE 2,659,833

ULTRAVIOLET VAPOR ELECTRIC DISCHARGE DEVICE

William T. Anderson, Jr., Maplewood, N. J., assignor to Hanovia Chemical and Mfg. Company, Newark, N. J., a corporation of New Jersey Application November 9, 1949, Serial No. 126,393

5 Claims. (Cl. 313—27)

The present invention relates to an ultraviolet vapor electric discharge device and more particularly to a vapor electric discharge lamp for the production of ultraviolet radiations used in photochemical processes.

The useful ultraviolet radiations for some photo-chemical processes are those which occur between the spectral limit 3200 A. and 3500 A.

High pressure mercury vapor arc discharge devices, commonly used as the source of ultraviolet radiations of photochemical processes, do not have an abundance of radiations within such spectral limits. Their efficiency for photochemical processes responsive to radiations within such spectral limits depends primarily upon the single emissive band of mercury at 3341 A. and without any substantial help from other useful radiations between such spectral limits.

Attempts have been made to increase the efficiency of mercury vapor arc discharge devices or lamps for photochemical processes by modifications such as the addition of metals, e. g. cadmium, zinc, or a combination of cadmium and zinc to the mercury contained in the discharge device or lamp envelope. Typical examples of such lamps, known as amalgam lamps, are the mercury-cadmium and mercury-zinc lamps with capillary fused quartz envelopes. The capillary arcs of such lamps operate at very high temperatures and vapor pressures which favor improved light emission in the visible portions of the spectrum, e. g. the red and green, but add very little to the radiations in the ultraviolet between the spectral limits 3200 A. and 3500 A.

It is an object of the present invention to provide a new and improved vapor electric discharge lamp for the production of ultraviolet radiations in the spectral region 3200 A. to 3500 A. It is another object of the present invention to provide a vapor electric discharge lamp which is economical to manufacture and operate and which is suitable for fields of application where it is desired to use primarily radiations in the ultraviolet between 3200 A. and 3500 A., and especially for the photochemical reactions which have their peak response in this spectral region. It is a further object of the present invention to provide a new and improved vapor electric discharge lamp having an envelope which confines the vapors of mercury and cadmium and which is proportioned to enable the co-existence of a partial high pressure mercury sustaining discharge and a partial low pressure cadmium discharge for the production of cadmium resonance radiation at 3261 A. Other objects and advantages of the present invention will become apparent from the description hereinafter following and the accompanying drawings forming part hereof, in which:

Figure 1 illustrates a diagrammatic representation of a lamp according to the present invention, Figure 2 illustrates graphically the relation between mercury and cadmium vapor pressures according to the present invention, Figure 3 illustrates graphically the characteristic radiation of mercury vapor between 3200 A. and 3500 A., Figure 4 illustrates graphically the radiations for the spectral region between 3200 A. and 3500 A. according to the present invention, and Figure 5 illustrates graphically the difference between the brightness of the arc of a mercury vapor discharge and mercury-cadmium vapor discharge under identical conditions.

According to the present invention, I provide an electric discharge lamp having a specifically dimensioned envelope which confines a combination of mercury vapor at high pressure and cadmium vapor at low pressure for the production in particular of ultraviolet radiations in the spectral region 3200 A. to 3500 A. More particularly, I provide a new and improved vapor electric discharge lamp wherein, by the use of optimum power loading, defined spatial relations between the walls of the envelope and length of the discharge path, and proportioning of molecular concentrations of mercury and cadmium, I have obtained greatly improved radiations in the ultraviolet region defined by the range 3200 A. to 3500 A., which are especially useful for photochemical reactions which have their peak response in this spectral region. The term "power loading" herein used refers to the total power in watts in the lamp envelope divided by the surface area of the lamp envelope containing the metal vapor. Power loading, spatial relations and proportioning of concentrations of metal vapors are critical factors according to my invention. For example, I have found that for the efficient production of cadmium resonance radiation at 3261 A., it is essential that the partial pressure of cadmium vapor be kept low and that the discharge envelope cross-section be sufficiently great to keep the cadmium vapor from becoming overheated by the intensely hot core of the constricted high pressure mercury discharge, which I employ mostly to maintain the partial pressure of cadmium vapor at the required low partial pressure. Therefore, envelopes such as capillary type envelopes are entirely unsuited for the efficient production of the wanted radiations.

Figure 1 illustrates a form of lamp to which my invention may be applied, although it is apparent that modifications thereof are possible within the scope of the invention. For example, instead of providing a lamp having a single wall tubular envelope, I may enclose this envelope within one or more envelopes of ultraviolet transmitting glass, which may be evacuated or contain an inert gas filling at partial pressure of a filling of a thermally insulating gas such as carbon dioxide, to conserve heat and provide more stable operation during changes of ambient air temperatures. The tubular discharge envelope 1 is composed of a material transparent to ultraviolet radiations and refractory to heat produced at the required power loading, e. g. fused quartz, vycor, and other refractory glasses. Electrodes 2 and 3 are hermetically sealed into the envelope. The electrodes shown are merely illustrative and may be of any applicable design or composition, e. g. tungsten or tantalum coils together with electron emitting materials such as thorium or barium. A third electrode, not shown, may be added for starting the discharge if desired. In accordance with the spatial relation between the walls of the envelope and length of discharge path hereinbefore mentioned, the length of the discharge path is indicated by the letter A and the cross-section or inner diameter of the envelope is indicated by the letter B. The desired mathematical relationship between A and B is critical for the reasons hereinafter set forth.

It is well known in the art that the ultraviolet output from a homogeneous vapor electric discharge, i. e. single metal vapor electric discharge, at the constant power input, increases as the inner diameter of the confining envelope decreases. However, I have found that the ultraviolet output from a non-homogeneous vapor electric discharge, i. e. the vapor electric discharge of two or more metals, at constant power input, does not follow this rule under all circumstances and particularly with mercury at relatively high partial pressures and cadmium at very low partial pressures. In the latter case, i. e. the output from a non-homogeneous vapor electric discharge, as the envelope diameter decreases a point is reached at which the ultraviolet output between 3200 A. and 3500 A. is at a maximum. Further decrease in the diameter of the envelope results in decreased ultraviolet emission.

Therefore, as the light path is lengthened, it is necessary to increase the inner diameter of the envelope by a definite amount if optimum emission of wanted ultraviolet radiations is to be maintained. Since the optimum inner diameter B of the envelope is dependent upon the length of the discharge path A, the optimum value of B may be obtained by a formula according to my invention which uses numerical measurements in centimeters. If A is the distance between the free ends of the electrodes, i. e. the discharge path, and if B is the inner diameter of the envelope, then:

$$\log_e A = B^{3/2}$$

This formula may be converted to logarithms base 10, which is the practical form of application. The formula may also be modified so that the walls of the envelope may be spaced from the center of a discharge arc occurring between two spaced electrodes at a distance in centimeters approximately one-half the logarithm raised to the $3/2$ power in relation to the length of the discharge arc.

In consideration of other factors of my invention, e. g. optimum power loading and proportioning of molecular concentrations of mercury and cadmium which are hereinafter particularly described, optimum emission or wanted radiation is provided by critical spatial relationships having typical values such as:

When B=1.5 cm., then A=6 cm., or to 12% less than 6 cm.
When B=1.8 cm., then A=11.3 cm., or to 12% less than 11.3 cm.
When B=2.0 cm., then A=16.9 cm., or to 12% less than 16.9 cm.
When B=2.5 cm., then A=61.9 cm., or to 10% less than 61.9 cm.
When B=3.0 cm., then A=180 cm., or to 10% less than 180 cm.

This critical relationship between envelope diameter and discharge path length does not apply to a high pressure mercury arc discharge, or a high pressure cadmium arc discharge, or a combination of high pressure arc of mercury and cadmium such as known to the art. Its application is practical when the addition of a very small amount of a suitable second metal vapor to a high pressure vapor discharge results in the broadening of the discharge, for example, such as illustrated by Figure 5, which shows the increased ultraviolet emission of wanted radiation and the broadening of the discharge arc in comparison with the high pressure discharge arc without such second metal addition.

As the dimensions of the lamp are altered in accordance with the formula above indicated, the quantities of mercury, cadmium, and the power input must be proportionately changed to maintain an optimum power loading.

In a lamp such as herein described, the envelope has a filling of an ionizable medium consisting of rare gas, such as argon, krypton or xenon at 1 to 30 millimeters pressure for starting the discharge when electrical potential is applied. The envelope also contains mercury and cadmium in amounts hereinafter described in detail.

Figure 2 shows the relations between the partial vapor pressures of mercury and cadmium at a number of power loadings per square inch of envelope surface. I have found that the ultraviolet emission between 3200 A. and 3500 A. from cadmium vapor is at its optimum when the cadmium vapor is at a partial pressure of about 0.002 atmosphere. The required optimum power loading to provide this vapor pressure is about 50 watts per square inch of envelope surface, although, within the scope of my invention, a power loading of from 45 watts per square inch to 55 watts per square inch will provide a suitable cadmium vapor pressure for useful radiations between 3200 A. and 3500 A. for photochemical reactions having their peak response in this spectral region. This power loading could be provided inefficiently by the operation of a low pressure cadmium discharge at relatively high currents such as 50 amperes, or by the external application of heat, but I obtain the power loading in my invention by including in the same envelope with the cadmium sufficient mercury to provide, when evaporated, a power loading of about 50 watts per square inch at a current of only 3 to 4 amperes, which is obviously much more economical. The partial pressure of mercury vapor required for a power loading of 50 watts per square inch is approximately 2 atmospheres, which is about one thousand times greater than the desired optimum cadmium vapor pressure. Since metal vapors obey the gas law, the total pressure in a lamp according to my invention is the sum of the partial pressure of the constituent gases, and the partial pressures of the cadmium and rare gas are so low, relative to the partial pressure of mercury, that the latter is the controlling pressure in the lamp and provides a power loading of more than 90 percent of the optimum power loading. For example, the total vapor pressure in the lamp may be about 2 atmospheres to provide a power loading of 50 watts per square inch of which the mercury vapor partial pressure may supply to the envelope walls a power loading at about 45 watts per square inch and the cadmium vapor an additional pressure at about 5 watts per square inch, said total pressure consisting of about 99 percent by weight of mercury, .1 percent by weight of cadmium and .9 percent by weight of rare gases.

To obtain the greatly improved radiations in the ultraviolet region defined by the range 3200 A. to 3500 A., I may use 115 milligrams of mercury and 0.054 milligram of cadmium for a power loading of 47 watts per square inch. This proportion of mercury and cadmium provides a vapor phase concentration of only about 0.046 percent cadmium, by weight, of the mercury vapor, and is sufficient for the operation of the lamp. However, with the quantities of mercury and cadmium stated, both metals are completely evaporated during prolonged use of the lamp. Since cadmium vapor is an excellent getter for oxygen which is liberated from the electrodes and envelope during operation of the lamp, cadmium oxide will be formed after prolonged use. The cadmium oxide does not participate in the discharge with the result that the stated vapor phase concentration of about 0.046 percent cadmium is not maintained and the efficiency of the lamp decreases. Therefore, for a practical lamp, I use about 10 times the stated quantity of cadmium. The excess of cadmium lies inertly on the walls of the lamp envelope until needed to replace cadmium which has been removed by oxidation. The cadmium in the vapor phase then remains about 0.046 percent by weight of the mercury vapor.

The advantages of a lamp of the type above described are apparent from Figures 3 and 4. Figure 3 illustrates the spectral emission of a lamp between the range 3200 A. and 3500 A., said lamp containing an ionizable medium of mercury vapor and rare gas and being operated at 400 watts input with a power loading of 47 watts per square inch. Figure 4 illustrates the spectral emission of a lamp between the range 3200 A. and 3500 A. and containing mercury, rare gas and cadmium according to the present invention, said lamp being operated at 400 watts input with a power loading of 47 watts per square inch, the mercury and cadmium content being, for example, mercury about 99.95 percent by weight and cadmium about 0.05 percent by weight. It is apparent from Figure 3 that, excepting for the background radiation of about 0.1 milliwatt per 10 angstrom lines, all the radiation is in the one band at 3341 A. From Figure 4, and in accordance with my invention, it is apparent that the radiation in the region 3200 A.–3500 A. has been increased greatly with additional cadmium bands at 3261 A., 3403 A. and 3466 A.

Therefore, the above described lamps offer important advantages for fields of application where it is desirable to use primarily radiation in the ultraviolet between 3200 A. and 3500 A. for the photochemical reactions which have their peak response in this spectral region, such as, for example, the chlorine and dye fixation reactions. In one of the above designated applications, my invention has made it possible to replace a 3000 watt carbon arc lamp by a single 400 watt lamp at a very considerable reduction in operating and equipment cost.

The present invention is not to be limited to the specific values herein set forth since it is within the scope of the invention to provide the greatly improved spectrum between 3200 A. and 3500 A. by slight variations of such values. For example, each of the stated optimum values of mercury vapor pressure, cadmium vapor pressure, power loading and concentrations of mercury and cadmium may be varied as long as correspondingly suitable variations are made in the critical factors according to my invention.

What I claim is:

1. In a vapor electric discharge device for the production of ultraviolet radiations in the spectral region between 3200 A. and 3500 A., the combination comprising an ultraviolet light transmissive envelope, at least a pair of spaced electrodes and an ionizable medium comprising mercury and cadmium within said envelope, said electrodes being spaced so that an electric discharge path in said medium has a length A related to the inner diameter B of said envelope substantially according to the formula: $Log_e A = B^{3/2}$, said mercury being present in an amount sufficient when vaporized to provide a high pressure mercury discharge at a partial pressure of approximately 2 atmospheres, said cadmium being present in an amount sufficient when vaporized to provide a partial pressure of approximately .002 atmosphere for the production of cadmium resonance radiation at 3261 A.

2. In a vapor electric discharge device according to claim 1, an outer heat conserving envelope transparent to ultraviolet radiations between 3200 A. and 3500 A.

3. In a vapor electric discharge device for the production of ultraviolet radiations in the spectral region between 3200 A. and 3500 A., the combination comprising an ultraviolet light transmissive envelope, a pair of spaced electrodes and an ionizable medium consisting of rare gas, mercury and cadmium within said envelope, said electrodes being spaced so that an electric discharge path in said medium has a length A related to the inner diameter B of said envelope substantially according to the formula:

$$Log_e A = B^{3/2}$$

said rare gas and said mercury and cadmium in vapor form being at partial pressures of about 0.03, 2 and 0.002 atmospheres respectively.

4. In a vapor electric discharge lamp for the production of ultraviolet radiations in the spectral region between 3200 A. and 3500 A., the combination of an envelope transparent to ultraviolet radiations and containing a pair of spaced electrodes, an ionizable medium consisting in vapor form, of about 99 percent by weight of mercury and 0.1 percent of cadmium, about 0.9 percent by weight of rare gas for starting an arc discharge for a total pressure of about 2 atmospheres, said electrodes being spaced so that an electric discharge path in said medium has a length A related to the inner diameter B of said envelope substantially according to the formula:

$$\text{Log}_e A = B^{3/2}$$

and an enclosing insulating envelope transparent to ultraviolet radiations between 3200 A. and 3500 A.

5. In a vapor electric discharge lamp for the production of substantial ultraviolet radiations in the spectral region 3200 A. to 3500 A., a combination comprising an elongated envelope transparent to ultraviolet radiations in said spectral region and contained therein a pair of electrodes, a starting electrode, an ionizable medium of rare gas, mercury and cadmium, a reserve of unevaporated cadmium to maintain the cadmium vapor during the life of the lamp at a partial pressure of about 0.002 atmosphere, mercury vapor at a partial pressure of about 2 atmospheres, said electrodes being spaced so that an electrical discharge path in said medium has a length A related to the inner diameter B of said envelope substantially according to the formula:

$$\text{Log}_e A = B^{3/2}$$

and a surrounding outer envelope transparent to ultraviolet radiations, said outer envelope being partial evacuated to provide constancy of vapor pressures with changes in ambient temperatures.

WILLIAM T. ANDERSON, Jr.

References Cited in the file of this patent

UNITED STATES PATENTS

| Number | Name | Date |
|---|---|---|
| 1,948,261 | Francis | Feb. 20, 1934 |
| 1,984,426 | Pirani | Dec. 18, 1934 |
| 2,042,195 | Scott | May 26, 1936 |
| 2,116,677 | Foulke | May 10, 1938 |
| 2,467,687 | Noel | Apr. 19, 1949 |

FOREIGN PATENTS

| Number | Country | Date |
|---|---|---|
| 431,409 | Great Britain | July 8, 1935 |